US009429971B2

(12) United States Patent
Mallala et al.

(10) Patent No.: US 9,429,971 B2

(45) Date of Patent: Aug. 30, 2016

(54) SHORT-CIRCUIT PROTECTION FOR VOLTAGE REGULATORS

(71) Applicant: Texas Instruments Incorporated, Dallas, TX (US)

(72) Inventors: Suresh Mallala, Bangalore (IN); Somshubhra Paul, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 211 days.

(21) Appl. No.: 14/453,059

(22) Filed: Aug. 6, 2014

(65) Prior Publication Data

US 2016/0043539 A1 Feb. 11, 2016

(51) Int. Cl.
*H02H 3/00* (2006.01)
*G05F 1/569* (2006.01)

(52) U.S. Cl.
CPC .................................... *G05F 1/569* (2013.01)

(58) Field of Classification Search
CPC ....................................................... G05F 1/569
USPC ............................................................ 361/18
See application file for complete search history.

(56) References Cited

U.S. PATENT DOCUMENTS

| | | | | |
|---|---|---|---|---|
| 4,218,647 A * | 8/1980 | Haas | H02M 3/3376 | 323/268 |
| 6,760,675 B1 * | 7/2004 | Szwec | H03K 3/64 | 327/178 |
| 2013/0328854 A1 | 12/2013 | Ruan et al. | | |
| 2014/0198415 A1 | 7/2014 | Schulmeyer et al. | | |

FOREIGN PATENT DOCUMENTS

| | | |
|---|---|---|
| RU | 2120658 C1 | 10/1998 |

* cited by examiner

*Primary Examiner* — Stephen W Jackson

(74) *Attorney, Agent, or Firm* — John R. Pessetto; Frank D. Cimino

(57) ABSTRACT

Circuits and methods for providing short-circuit protection in a voltage regulator are disclosed. A voltage regulator includes a pass switch, a voltage error amplifier, a driver circuit, and a short-circuit protection circuit. The pass element is coupled to a power supply and a load, and generates an output voltage in response to a drive signal. The voltage error amplifier generates an error voltage based on a difference of a reference voltage and the output voltage and the driver circuit generates the drive signal in response to the error voltage. The short-circuit protection circuit senses the drive signal and provides a high-resistance path to the driver circuit in a short-circuit event. In a short-circuit event, the high-resistance path clamps current in the driver circuit thereby clamping a voltage difference between the first and third terminals and thereby limiting a load current in the short-circuit event.

13 Claims, 4 Drawing Sheets

SHORT-CIRCUIT PROTECTION FOR VOLTAGE REGULATORS

TECHNICAL FIELD

The present disclosure generally relates to the field of short-circuit protection for voltage regulators.

BACKGROUND

Voltage regulators are extensively used in power management applications of portable battery operated devices in order to provide stable or constant output voltages to a load, irrespective of input voltages and output currents. Some examples of the portable battery operated devices include mobile phones, laptops, tablets, and the like. An example of a voltage regulator is a low dropout (LDO) voltage regulator. A typical LDO voltage regulator is a direct current (DC) linear voltage regulator that operates with minimal input-output differential voltage. During power-up of the LDO voltage regulator or in a fault condition, the LDO voltage regulator enters a short-circuit event or a short-circuit mode in which a current due to the short-circuit event is generated that can damage a pass transistor in the LDO voltage regulator. In order to protect the pass transistor and battery from such damage, source-gate voltage of the pass transistor is clamped. A short-circuit protection circuit is used in the LDO voltage regulator to clamp the source-gate voltage of the pass transistor, and to clamp or limit the current due to the short-circuit event. In order to clamp the source-gate voltage of the pass transistor, the short-circuit protection circuit bypasses the current due to the short-circuit event using a parallel pull-up path at a gate of the pass transistor. However, current consumption in the LDO voltage regulator is still high as the current due to the short-circuit event is not effectively limited during the short-circuit event and a quiescent current of the LDO voltage regulator remains high.

SUMMARY

This Summary is provided to introduce a selection of concepts in a simplified form that are further described below in the detailed description. This Summary is not intended to identify key or essential features of the claimed subject matter, nor is it intended to be used as an aid in determining the scope of the claimed subject matter.

Various circuits and methods for providing short-circuit protection in a voltage regulator are disclosed. The voltage regulator includes a pass switch, a voltage error amplifier, a driver circuit, and a short-circuit protection circuit. The pass switch electrically couples the power supply with a load during an ON-state of the pass switch and electrically decouples the power supply from the load during an OFF-state of the pass switch. The pass-switch includes a first terminal, a second terminal and a third terminal, where the first terminal is coupled to the power supply and the second terminal is coupled to the load. The pass switch is configured to generate an output voltage at the second terminal in response to a drive signal received at the third terminal. The voltage error amplifier includes a first input terminal, a second input terminal and an output terminal. The voltage error amplifier is configured to receive a reference voltage at the first input terminal and the output voltage at the second input terminal, and is further configured to generate an error voltage at the output terminal of the voltage error amplifier based on a difference of the reference voltage and the output voltage. The driver circuit is coupled to the voltage error amplifier at the output terminal and to the pass switch at the third terminal. The driver circuit is configured to generate the drive signal in response to the error voltage. The short-circuit protection circuit is coupled to the pass switch at the third terminal and is configured to sense the drive signal received at the third terminal. The short-circuit protection circuit is configured to provide a high-resistance path to the driver circuit during a short-circuit event of the voltage regulator based on the drive signal. The high-resistance path provided to the driver circuit enables clamping a current in the driver circuit thereby clamping a voltage difference between the first terminal and the third terminal and thereby limiting a load current in the short-circuit event. The short-circuit protection circuit is configured to provide a low-resistance path to the driver circuit during a non short-circuit event.

In another embodiment, a method of providing short-circuit protection in a voltage regulator is disclosed. The method includes generating an output voltage by a pass switch based on a drive signal to drive a load. The pass-switch includes a first terminal, a second terminal and a third terminal, where the first terminal is coupled to a power supply and the second terminal is coupled to the load. The output voltage is generated at the second terminal in response to a drive signal received at the third terminal by electrically coupling the power supply with the load in an ON-state of the pass switch and by electrically decoupling the power supply from the load in an OFF-state of the pass switch. The method includes providing the drive signal, by a driver circuit, based on a difference of the output voltage and a reference voltage. The method further includes controlling a load current in a short-circuit event of the voltage regulator. The method controls the load current in a short-circuit event of the voltage regulator by performing sensing the drive signal received at the third terminal, and by providing a high-resistance path to the driver circuit during the short-circuit event of the voltage regulator based on the sensing of the drive signal. In an example embodiment, the high-resistance path is provided to the driver circuit enables clamping of a current in the driver circuit thereby clamping a voltage difference between the first terminal and the third terminal and thereby limiting the load current in the short-circuit event.

Other aspects and example embodiments are provided in the drawings and the detailed description that follows.

The drawings referred to in this description are not to be understood as being drawn to scale except if specifically noted, and such drawings are only exemplary in nature.

DETAILED DESCRIPTION

Power management techniques are used in electronic devices, primarily in battery powered and hand-held devices, to effectively manage battery life in these devices. Most of the electronic devices, for example mobile phones, laptops and the like, use voltage regulators to regulate output voltages provided to loads in such electronic devices. Herein, in an example, the term 'voltage regulator' refers to an electronic device that produces a steady and fixed output voltage, independently of its input voltage and output current. An example of the voltage regulator is a low dropout (LDO) voltage regulator that is a linear regulator operating using a very low dropout voltage. Herein, the term 'dropout voltage' refers to a lowest voltage drop between input and output voltages that generates a regulated output voltage. During power-up of the LDO voltage regulator or during a fault condition, for example a solder short during testing, the LDO voltage regulator enters a short-circuit event during which a high load current is generated that can damage a pass switch in the LDO voltage regulator. In order to protect the pass transistor and a load from such damage, source-gate voltage of the pass transistor has to be clamped. A short-circuit protection circuit is used in the LDO voltage regulator to clamp the source-gate voltage of the pass transistor by clamping a current due to the short-circuit event, and to thereby maintain a constant output voltage at the load, while simultaneously maintaining low current consumption in the LDO voltage regulator. An example LDO voltage regulator (that is not in accordance with example embodiments of the present invention) is explained with reference to FIG. 1. Some example LDO voltage regulators (that are in accordance with example embodiments of the present invention) are explained with reference to FIGS. 2 and 3. Herein, for the purposes of this description, unless specified otherwise, the short-circuit event is used to refer to events including, but not limited to, a solder short during testing, a power-up event of the LDO voltage regulator or any other short-circuit event due to accident, power-up or fault conditions.

Figure 1:
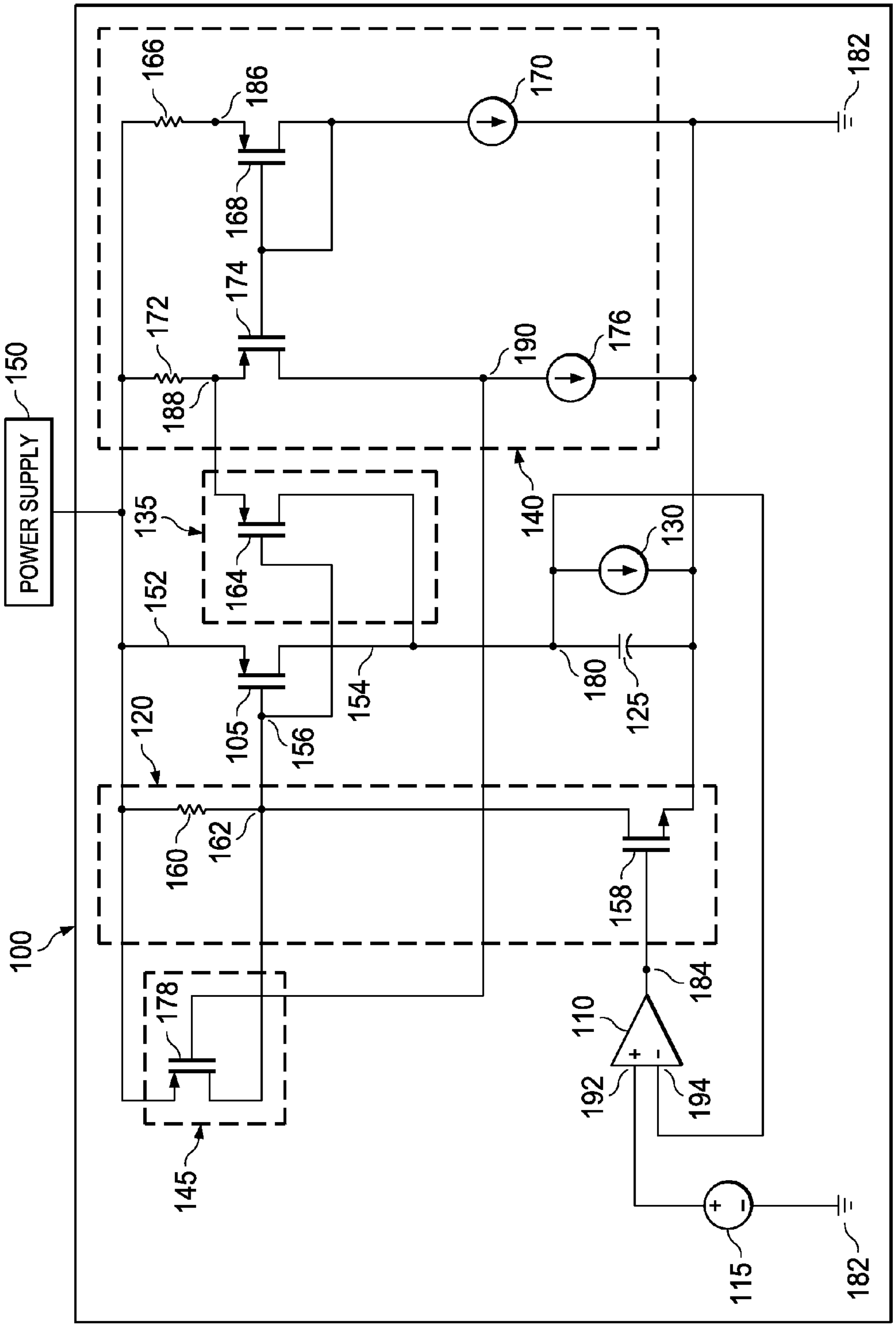
FIG. 1 is a circuit diagram of a voltage regulator, in accordance with an example scenario.

FIG. 1 is a circuit diagram of a voltage regulator, in accordance with an example scenario. In this example scenario, a voltage regulator 100, for example a low dropout (LDO) voltage regulator, is shown that is designed to operate with a minimal voltage difference (also referred to as a saturation voltage) between a source voltage and an output voltage. The voltage regulator 100 includes a pass switch 105, a voltage error amplifier 110, a reference supply 115, a driver circuit 120, and a capacitor 125. The voltage regulator 100 provides a load current (shown as 130). The voltage regulator 100 further includes a sense circuit 135, an amplifier circuit 140, and a control circuit 145 that collectively form a short-circuit protection circuit. The pass switch 105 electrically couples and electrically decouples a power supply 150, for example a battery or an adaptor, to a load. The pass switch 105 includes a source terminal 152, a drain terminal 154 and a gate terminal 156. The driver circuit 120 includes a driver transistor 158, and a resistor 160 coupled between the power supply 150 and the driver transistor 158. The resistor 160 is also coupled to the gate terminal 156 of the pass switch 105, and such connection is represented by a node 162 that is connected to the resistor 160 and the gate terminal 156. The sense circuit 135 includes a sense transistor 164. The amplifier circuit 140 includes a first resistor 166, a first transistor 168, a first bias current source 170, a second resistor 172, a second transistor 174, and a second bias current source 176. The control circuit 145 includes a control transistor 178. In this example scenario, the pass switch 105, the sense transistor 164, the first transistor 168, the second transistor 174, and the control transistor 178 are p-type metal oxide semiconductor (PMOS) transistors. In this example scenario, the driver transistor 158 is an n-type metal oxide semiconductor (NMOS) transistor.

The source terminal 152 is coupled to the power supply 150, the drain terminal 154 is coupled to an output terminal 180, and the gate terminal 156 is coupled to the driver transistor 158 and the resistor 160 (see, the node 162). The capacitor 125 is coupled between the drain terminal 154 (see, the output terminal 180) and a ground terminal 182 and the load current (shown as 130). The resistor 160 is coupled between the power supply 150 and a drain terminal of the driver transistor 158 (see, the node 162). A source terminal of the driver transistor 158 is coupled to the ground terminal 182, and a gate terminal of the driver transistor 158 is coupled to an output terminal 184 of the voltage error amplifier 110. A gate terminal of the sense transistor 164 is coupled to the gate terminal 156 (see, the node 162), and a drain terminal of the sense transistor 164 is coupled to the drain terminal 154 of the pass switch 105. The first resistor 166 is coupled to the power supply 150, and to a source terminal of the first transistor 168 (see, a node 186). The first bias current source 170 is coupled between a drain terminal of the first transistor 168 and the ground terminal 182. The drain terminal of the first transistor 168 is coupled to a gate terminal of the first transistor 168. In an example, the first transistor 168 is a diode connected transistor.

The second resistor 172 is coupled to the power supply 150, and to a source terminal of the second transistor 174 (see, a node 188). The second bias current source 176 is coupled between a drain terminal of the second transistor 174 and the ground terminal 182. The coupling of the second bias current source 176 to the drain terminal of the second transistor 174 is shown at an output node 190 of the amplifier circuit 140. The source terminal of the second transistor 174 is further coupled to the source terminal of the sense transistor 164 (see, connections at the node 188), and a gate terminal of the second transistor 174 is coupled to the gate terminal of the first transistor 168. A source terminal of the control transistor 178 is coupled to the power supply 150, and a drain terminal of the control transistor 178 is coupled to the gate terminal 156 of the pass switch 105 (see, the connections at the node 162). A gate terminal of the control transistor 178 is coupled to the drain terminal of the second transistor 174 (see, the connections at the output node 190) of the amplifier circuit 140.

In an example scenario, a power supply voltage (Vdd) is an unregulated input voltage that is generated by the power supply 150. The pass switch 105 is a series pass switch in the voltage regulator 100 that is used to pass the Vdd to the output terminal 180 as an output voltage (a regulated output voltage referred to as 'Vout') at the output terminal 180, for supplying power to the load. In order to maintain Vout at a constant level, the Vout is fed to an inverting input 194 of the voltage error amplifier 110 via a feedback path. The reference supply 115 generates a reference voltage (for example, a stable reference voltage referred to as Vref) that is provided to a non-inverting input 192 of the voltage error amplifier 110. The voltage error amplifier 110 compares Vref with Vout to generate an error voltage. Herein, the 'error voltage' refers to an amplified differential voltage generated based on comparing the Vref and the Vout. The driver transistor 158, in response to the error voltage, drives a gate terminal 156 of the pass switch 105 to an appropriate operating point that in turn adjusts the Vout to generate a constant Vout at the output terminal 180. However, during power-up of the voltage regulator 100 or during accidental or fault conditions, for example a solder short during testing, the voltage regulator 100 has a tendency to enter a short-circuit event.

During the short-circuit event, the output terminal 180 is directly shorted to the ground terminal 182 through a low resistance (the capacitor 125 is discharged), thereby decreasing Vout to a ground potential (for example, 0 volts (V)) and the load current (shown as 130) is increased significantly. During the short-circuit event, the error voltage is also increased significantly as Vref becomes higher than Vout. The driver circuit 120 is responsive to the increased error voltage and the driver transistor 158 demands a high pull-down current from the pass switch 105. A gate voltage of the pass switch 105 is hence decreased and a source-gate voltage of the pass switch 105 is increased to maintain the output voltage at the constant level. If there is no short-circuit protection circuit in the voltage regulator 100, voltage regulation is stopped in the voltage regulator 100. The short-circuit event leads to damage of the pass switch 105 of the voltage regulator 100 and battery of an electronic device that includes the voltage regulator 100.

In order to provide short-circuit protection to the voltage regulator 100, the circuit 100 includes the short-circuit protection circuit. The short-circuit protection circuit includes the sense circuit 135, the amplifier circuit 140, and the control circuit 145. The first bias current source 170 and the second bias current source 176 in the amplifier circuit 140 are configured to generate constant bias currents. A resistance (R2) of the second resistor 172 is less than a resistance (R1) of the first resistor 166, and a voltage at the node 188 is higher than a voltage at the node 186.

During a non short-circuit event (also referred to as a 'normal operation'), if the sense transistor 164 senses the gate voltage (voltage of the gate terminal 156) of the pass switch 105 increasing and the source-gate voltage of the pass switch 105 decreasing, the sense transistor 164 enables the voltage at the node 188 to be higher than a voltage at the node 186 of the amplifier circuit 140. During the non short-circuit event, the output node 190 of the amplifier circuit 140 is pulled up to Vdd (for example, biased with a bias voltage (Vbias) equivalent to Vdd). Due to the high bias voltage Vbias, the control transistor 178 is maintained in an OFF-state during the non short-circuit event.

During the short-circuit event, Vout starts decreasing and the load current (shown as 130) starts increasing. Such decrease in the Vout causes increase in the error voltage, and the gate voltage at the gate terminal 156 starts decreasing. The first bias current source 170 and the second bias current source 176 in the amplifier circuit 140 are configured to generate constant bias currents, and the resistance R2 of the second resistor 172 is less than the resistance R1 of the first resistor 166. As, the sense transistor 164 senses the gate voltage of the pass switch 105 decreased below a threshold low voltage (or the source-gate voltage of the pass switch 105 being more than a threshold high voltage), the sense transistor 164 enables the voltage at the node 188 to decrease (for example, lesser than Vdd) and become substantially equal to the voltage at the node 186 of the amplifier circuit 140. The amplifier circuit 140 biases the output node 190 of the amplifier circuit 140 with the bias voltage (Vbias). The bias voltage Vbias (a low bias voltage) is used to bias the gate terminal of the control transistor 178 such that the high pull-down current demanded by the driver transistor 158 is provided through the control transistor 178 thereby limiting the current through the resistor 160. Such phenomenon of limiting the current flowing through the resistor 160 causes a clamp down of the source-gate voltage of the pass switch 105. Accordingly, due to the low bias voltage Vbias, the control transistor 178 is switched to an ON-state and bypasses the high pull-down current flowing through the resistor 160, and the source-gate voltage of the pass switch 105 is hence clamped and a maximum load current (for example, due to the short-circuit event) is limited. In this manner, by using the control transistor 178 to bypass the high pull-down current and reducing resistance of the resistor 160, the voltage regulator 100 is protected in the short-circuit event.

However, the short-circuit protection scheme described in relation to FIG. 1 increases current consumption of the voltage regulator 100. For instance, even if the source-gate voltage of the pass switch 105 is clamped, the driver circuit 120 sinks the high pull-down current demanded by the driver transistor 158 from the pass switch 105.

Various example embodiments of the present technology provide solutions that are capable of providing short-circuit protection in voltage regulators and that are capable of providing reduced current consumption in the voltage regulators, and these solutions overcome the above described and other limitations, in addition to providing currently available benefits. Various example embodiments of the present technology are herein disclosed in conjunction with FIGS. 2-4.

Figure 2:
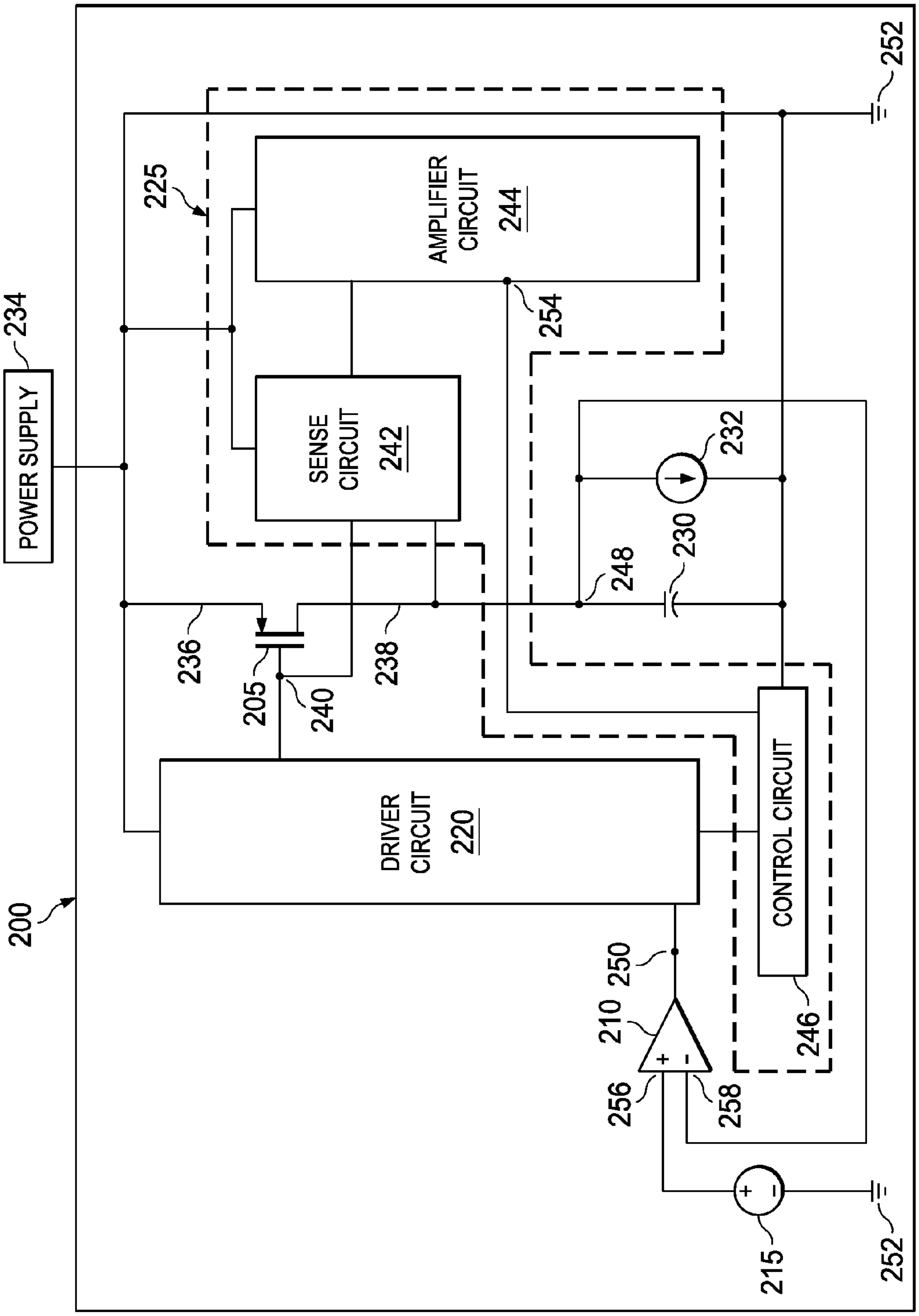
FIG. 2 is a block diagram of a circuit representing a first example voltage regulator, in accordance with an embodiment.

Referring to FIG. 2, a block diagram of a circuit representing a first example voltage regulator is illustrated, in accordance with an embodiment. In this example, a voltage regulator 200, for example a low dropout (LDO) voltage regulator, is shown that is designed to operate with a minimal voltage difference (also referred to as a saturation voltage) between an input voltage and an output voltage, and with reduced current consumption. The voltage regulator 200 includes a pass switch 205, a voltage error amplifier 210, a reference supply 215, a driver circuit 220, a short-circuit protection circuit 225 and a capacitor 230. The pass switch 205 electrically couples and electrically decouples a power supply 234, for example a battery or an adaptor, to a load. The pass switch 205 includes a source terminal 236, a drain terminal 238 and a gate terminal 240, and is configured to provide a load current (shown as 232) in response to the power supply (Vdd) and a drive signal received at the gate terminal 240. For instance, the pass switch 205 provides the load current based on a voltage difference between the source terminal 236 and the gate terminal 240 (dependent upon the drive signal). In this example embodiment of FIG. 2, the pass switch 205 is shown as a p-type metal oxide semiconductor (PMOS) transistor, however it should not be considered limiting to the scope of the present technology. For example, the pass switch 205 can be configured using other type of MOS switches, for example, n-type metal oxide semiconductor (NMOS). In other forms, the pass switch 205 can also be configured using bipolar junction transistors or other combinations of diodes and other active and passive electronic elements. The short-circuit protection circuit 225 further includes a sense circuit 242, an amplifier circuit 244, and a control circuit 246.

The source terminal 236 is coupled to the power supply 234, the drain terminal 238 is coupled to the capacitor 230 (see, connections at an output terminal 248), and the gate terminal 240 is coupled to the driver circuit 220 to receive the drive signal to control the operation of the pass switch 205. The driver circuit 220 is coupled to the power supply 234, an output terminal 250 of the voltage error amplifier 210, and to the control circuit 246. The sense circuit 242 is coupled to the power supply 234, the gate terminal 240, the drain terminal 238, and the amplifier circuit 244. The amplifier circuit 244 is coupled between the power supply 234 and a ground terminal 252. The coupling of the amplifier circuit 244 to the control circuit 246 is shown at an output node 254 of the amplifier circuit 244. The control circuit 246 is also coupled to the ground terminal 252. The capacitor 230 and the load current (shown as 232) are coupled between the drain terminal 238 (see, the connections at the node 248) and the ground terminal 252.

In an example scenario, a power supply voltage (Vdd) is an unregulated input voltage that is generated by the power supply 234. The pass switch 205 is a series pass switch in the voltage regulator 200 that is used to pass the Vdd to the output terminal 248 as an output voltage (a regulated output voltage). In order to maintain Vout at a constant level, the Vout is fed to an inverting input 258 of the voltage error amplifier 210 as a feedback path. The reference supply 215 generates a reference voltage (for example, a stable reference voltage Vref) that is provided to a non-inverting input 256 of the voltage error amplifier 210. The voltage error amplifier 210 compares Vref with Vout to generate an error voltage (Verror). Herein, the ‘error voltage’ refers to an amplified differential voltage generated based on comparing the reference voltage Vref and the output voltage Vout. The driver circuit 220 is responsive to the error voltage (Verror) and provides the drive signal. The drive signal is received at the gate terminal 240 of the pass switch 205 for controlling generation of Vout at the constant level. However, during power-up of the voltage regulator 200 or during accidental or fault conditions, for example a solder short during testing, the voltage regulator 200 has a tendency to enter a short-circuit event.

In order to provide short-circuit protection, the voltage regulator 200 includes the short-circuit protection circuit 225. In the example embodiment of FIG. 2, the short-circuit protection circuit 225 includes the sense circuit 242, the amplifier circuit 244, and the control circuit 246. During a non short-circuit event (also referred to as a ‘normal operation’), the sense circuit 242 senses any change in a gate voltage of the pass switch 205, for example, any increase or decrease (accordingly, decrease or increase of a source-gate voltage of the pass switch 205, respectively). The amplifier circuit 244, in response to a sensed signal received from the sense circuit 242, is configured to generate a bias voltage (Vbias) at the output node 254. It should be noted that during the normal operating conditions, the Vbias is approximately equivalent to Vdd. In this example embodiment, in response to the Vbias (a voltage approximately equivalent to Vdd), the control circuit 246 offers a low resistance. For example, the control circuit 246 can include one or more MOS transistors or switches that are switched to ON-states during the normal operation so as to provide a low resistance. Accordingly, during the normal operation, a path offered to the driver circuit 220 by the control circuit 246 is of a low-resistance path.

During the short-circuit event, Vout (voltage at the output terminal 248) starts decreasing to zero volt and the gate voltage (also referred to as ‘drive signal’) at the gate terminal 240 of the pass switch 205 is reduced. For instance, as the Vout decreases towards 0 V in the short-circuit event, the error voltage (Verror) increases and the pull-down current demanded by the driver circuit 220 also increases, thereby causing decrease in the gate voltage (also referred to as ‘Vgate’) at the gate terminal 240. It should be noted that the sense circuit 242 senses any change in the Vgate of the pass switch 205, for example the sense circuit 242 senses a decrease (accordingly, increase of the source-gate voltage (Vsg) of the pass switch 205) in the Vgate. In one embodiment, the amplifier circuit 244, in response to the sensed signal received from the sense circuit 242, is configured to generate the bias voltage (Vbias) at the output node 254. In this example embodiment, based on the Vbias, the control circuit 246 is caused to offer a high resistance. For example, the control circuit 246 can include one or more MOS transistors or switches that are switched to OFF-states during the short-circuit event and provides a high resistance. Accordingly, during the short-circuit event, a path offered to the driver circuit 220 by the control circuit 246 is of a high-resistance path having resistance more than that offered during the non short-circuit event of the voltage regulator 200. The high-resistance path clamps the current (for example, the pull-down current) through the driver circuit 220. It should be noted that by clamping the pull-down current through the driver circuit 220, there is a process of degenerating the driver circuit 220. As the pull-down current in the driver circuit 220 is clamped, the source-gate voltage (Vsg) of the pass switch 205 is clamped and accordingly the load current (for example, short-circuit current) is limited.

It should further be noted that during the short-circuit event in the voltage regulator 200, the current is clamped (for example, reduced) in the driver circuit 220 by offering higher resistance by the control circuit 246; whereas in the voltage regulator 100, the excess current through the driver circuit 120 is only bypassed by a parallel pull-up path (for example, the control circuit 145). Accordingly, current consumption in the voltage regulator 200 is reduced as compared to the current consumption in the voltage regulator 100. In this manner, the control circuit 246 provides the high-resistance path to the driver circuit 220 thereby providing the short-circuit protection in the voltage regulator 200. It should further be noted that stability of the voltage regulator 200 for an internal dominant pole is improved as compared to the voltage regulator 100 during the short-circuit event. For instance, a gain bandwidth of the voltage regulator 200 is determined by a transconductance (gm) of the driver circuit 220, and the present disclosure provisions a reduction of the transconductance (gm) of the driver circuit 220 by degenerating the driver circuit 220 during the short-circuit event.

Some example embodiments of a voltage regulator (for example, the voltage regulator 200) are also explained with reference to FIG. 3.

Figure 3:
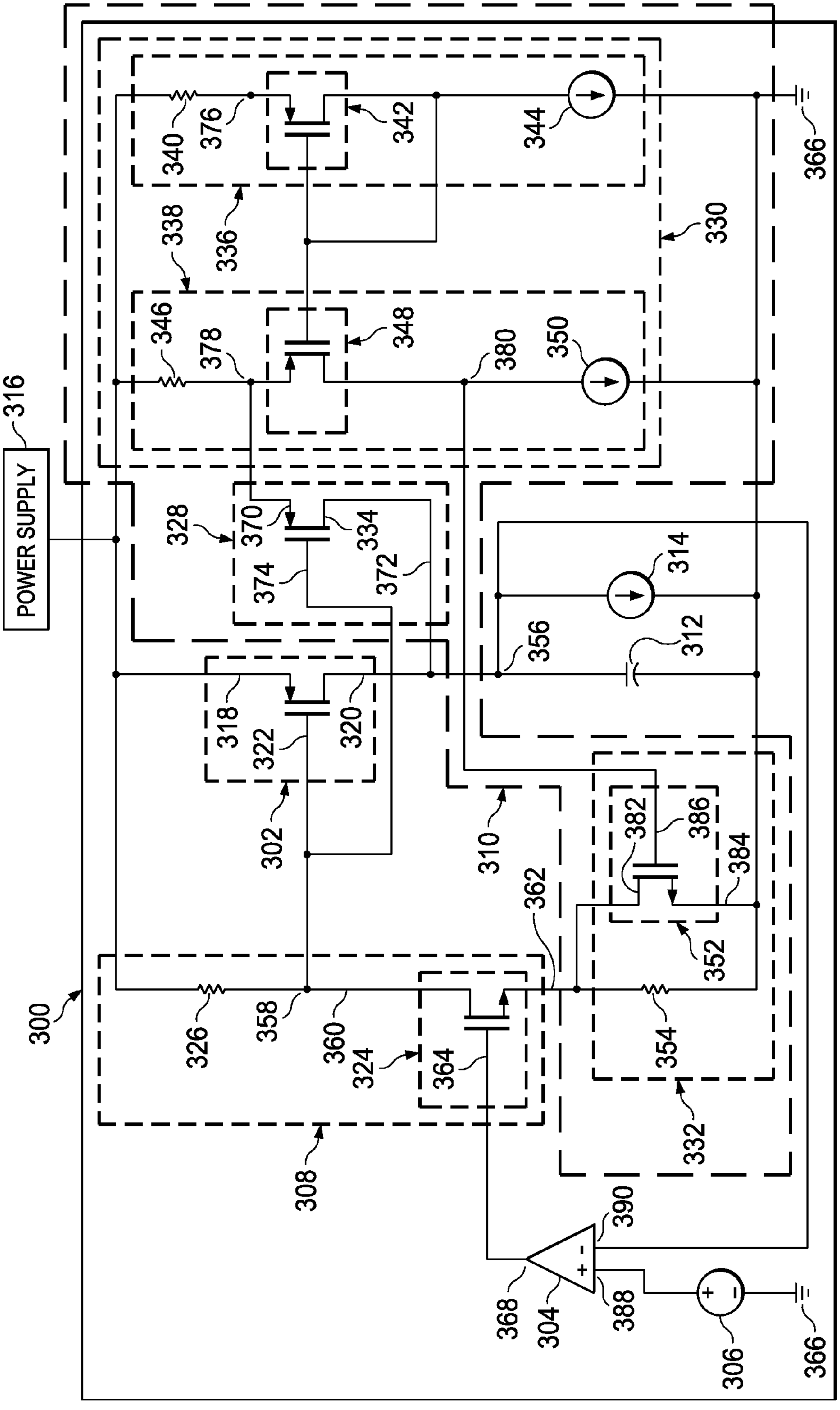
FIG. 3 is a circuit diagram of a second example voltage regulator, in accordance with an embodiment.

Referring to FIG. 3, a circuit diagram of a second example voltage regulator is shown, in accordance with an embodiment. In this example embodiment, a voltage regulator 300, for example a low dropout (LDO) voltage regulator, is shown that is designed to operate with a minimal voltage difference (also referred to as a saturation voltage) between an input voltage and an output voltage. The voltage regulator 300 includes a pass switch 302, a voltage error amplifier 304, a reference supply 306, a driver circuit 308, a short-circuit protection circuit 310, and a capacitor 312. The voltage regulator 300 provides a load current (shown as 314). The pass switch 302 is configured to electrically couple or electrically decouple a power supply 316, for example a battery or an adaptor, to a load based on a drive signal. The pass switch 302 includes a first terminal 318, a second terminal 320 and a third terminal 322. The driver circuit 308 includes a driver transistor 324 and a resistor 326. The short-circuit protection circuit 310 further includes a sense circuit 328, an amplifier circuit 330, and a control circuit 332. The sense circuit 328 includes a sense transistor 334. The amplifier circuit 330 includes a first amplifier circuit 336 and a second amplifier circuit 338. The first amplifier circuit 336 includes a first resistor 340, a first transistor 342, and a first bias current source 344. The second amplifier circuit 336 includes a second resistor 346, a second transistor 348, and a second bias current source 350. The control circuit 332 includes a control transistor 352 and a control resistor 354. In one example, the pass switch 302, the sense transistor 334, the first transistor 342, and the second transistor 348 are p-type metal oxide semiconductor (PMOS) transistors, however it should not be considered limiting to the scope of the present technology. For example, the pass switch 302, the sense transistor 334, the first transistor 342, and the second transistor 348 can be configured using other type of MOS switches, for example, n-type metal oxide semiconductor (NMOS) transistors. In other forms, the pass switch 302, the sense transistor 334, the first transistor 342, and the second transistor 348 can also be configured using bipolar junction transistors or other combinations of diodes and other active and passive elements. In one example, the driver transistor 324 and the control transistor 352 are n-type metal oxide semiconductor (NMOS) transistors, however it should not be considered limiting to the scope of the present technology. For example, the driver transistor 324 and the control transistor 352 can be configured using other type of MOS switches, for example, p-type metal oxide semiconductor (PMOS) transistors. In other forms, the driver transistor 324 and the control transistor 352 can also be configured using bipolar junction transistors or other combinations of diodes and other active and passive elements.

The first terminal 318 is coupled to the power supply 316, the second terminal 320 is coupled to an output terminal 356, and the third terminal 322 is coupled to the driver transistor 324 and the resistor 326 (see, the connections at a node 358). The capacitor 312 is coupled between the second terminal 320 (see, the output terminal 356) and a ground terminal 366 and the load current (shown as 314). The driver transistor 324 includes a first node 360, a second node, 362 and a third node 364. The resistor 326 is coupled between the power supply 316 and the first node 360 of the driver transistor 324 (see, the connections at the node 358). The second node 362 of the driver transistor 324 is coupled to the ground terminal 366, and the third node 364 of the driver transistor 324 is coupled to an output terminal 368 of the voltage error amplifier 304. The sense transistor 334 includes a source terminal 370 (a terminal of the sense circuit 328), a drain terminal 372, and a gate terminal 374. The gate terminal 374 of the sense transistor 334 is coupled to the third terminal 322 (see, the connections at the node 358), and the drain terminal 372 of the sense transistor 334 is coupled to the second terminal 320 of the pass switch 302. The first resistor 340 is coupled to the power supply 316 and a source terminal of the first transistor 342 (see, the connections at a node 376). The first bias current source 344 is coupled between a drain terminal of the first transistor 342 and the ground terminal 366. The drain terminal of the first transistor 342 is coupled to a gate terminal of the first transistor 342. In an example, the first transistor 342 is a diode connected transistor.

The second resistor 346 is coupled to the power supply 316, and to a source terminal of the second transistor 348 (see, the connections at a node 378). The second bias current source 350 is coupled between a drain terminal of the second transistor 348 and the ground terminal 366. The coupling of the second bias current source 350 to the drain terminal of the second transistor 348 is shown at an output node 380 of the amplifier circuit 330. The source terminal of the second transistor 348 is further coupled to the source terminal 370 of the sense transistor 334 (see, the connections at the node 378), and a gate terminal of the second transistor 348 is coupled to the gate terminal of the first transistor 342. The control transistor 352 includes a drain node 382, a source node 384, and a gate node 386. The drain node 382 of the control transistor 352 is coupled to the second node 362 of the driver transistor 324, the source node 384 of the control transistor 352 is coupled to the ground terminal 366, and a gate node 386 of the control transistor 352 is coupled to the drain terminal of the second transistor 348 (see, the connections at the output node 380) of the amplifier circuit 330.

Some example embodiments of the working of the voltage regulator 300 are hereinafter explained. In an example, a power supply voltage (Vdd) generated by the power supply 316, can be an unregulated input voltage. The pass switch 302 is a series pass switch in the voltage regulator 300 that is used to pass the Vdd to the output terminal 356 as an output voltage (a regulated output voltage referred to as 'Vout') at the output terminal 356. In order to maintain Vout at a constant level, the Vout is fed to an inverting input 390 of the voltage error amplifier 304 via a feedback path. The reference supply 306 generates a reference voltage (for example, a stable reference voltage referred to as Vref) that is provided to a non-inverting input 388 of the voltage error amplifier 304. The voltage error amplifier 304 compares Vref and Vout to generate an error voltage (Verror) based on the difference of the Vref and Vout. Herein, the 'error voltage' refers to an amplified differential voltage generated based on comparing the Vref and the Vout. The driver transistor 324, in response to the error voltage Verror, drives the third terminal 322 (gate terminal) of the pass switch 302 to an appropriate operating point (for example, the drive signal and Vsg of the pass switch 302) that in turn adjusts the Vout to generate a constant Vout at the output terminal 356. As operating point or Vdd changes, the voltage error amplifier 304 modulates a voltage at the third terminal 322 of the pass switch 302 to maintain the constant Vout at the output terminal 356. It should be noted that during power-up of the voltage regulator 300 or during accidental or fault conditions, for example a solder short during testing, the voltage regulator 300 has a tendency to enter a short-circuit event, and that is precluded by the short-circuit protection circuit 310 in combination with other circuit elements.

In order to provide short-circuit protection, the voltage regulator 300 includes the short-circuit protection circuit 310. In the example embodiment of FIG. 3, the short-circuit protection circuit 310 includes the sense circuit 328, the amplifier circuit 330, and the control circuit 332. In one embodiment, the first bias current source 344 and the second bias current source 350 in the amplifier circuit 330 are configured to generate constant bias currents. A resistance (R2) of the second resistor 346 is less than a resistance (R1) of the first resistor 340, and a voltage (first voltage) at the node 376 is substantially lower than a voltage (second voltage) at the node 378.

During a non short-circuit event (also referred to as a 'normal operation'), the sense transistor 334 senses any change in gate voltage (voltage of the third terminal 322) of the pass switch 302, for example, any increase or decrease (accordingly, decrease or increase of the source-gate voltage (Vsg) of the pass switch 302, respectively). The amplifier circuit 330, in response to a sensed signal received from the sense transistor 334, is configured to generate a bias voltage (Vbias) at the output node 380. It should be noted that during the normal operating conditions, the Vbias is approximately equivalent to Vdd. In this example embodiment, based on the Vbias (a voltage approximately equivalent to Vdd, a high bias voltage), the control transistor 352 (NMOS transistor)

offers a low-resistance. For example, the control transistor 352 achieves (for example, is switched to) an ON-state during the normal operation and provides a low ON resistance. Accordingly, during the normal operation, a path offered to the driver transistor 324 by the control circuit 332 is a low-resistance path.

During the short-circuit event, Vout (voltage at the output terminal 356) starts decreasing to zero volt and the gate voltage (also referred to as 'drive signal') at the third terminal 322 of the pass switch 302 is reduced. For instance, as the Vout decreases towards 0 V in the short-circuit event, the error voltage (Verror) increases and the pull-down current demanded by the driver transistor 324 also increases, thereby causing decrease in the gate voltage (also referred to as 'Vgate') at the third terminal 322. It should be noted that the sense transistor 334 senses any change in the gate voltage of the pass switch 302, for example, any decrease (accordingly, increase of the source-gate voltage of the pass switch 302). The sense transistor 334 mirrors current through the pass switch 302 and, accordingly, if the load current (shown as 314) increases, a sense current (sensed by the sense transistor 334 from the third terminal 322) also increases. Such increase in the sense current enables the voltage at the node 378 to decrease (for example, less than Vdd) and to be substantially equal to the voltage at the node 376 of the amplifier circuit 330. The amplifier circuit 330, in response to the sensed signal (the voltage at the node 378 is the sensed signal) received from the sense circuit 328, is configured to generate a bias voltage (Vbias) at the output node 380. It should be noted that during the short-circuit event, in an example, the Vbias (a low bias voltage) is a voltage that enables the control circuit 332 to provide (or act as) a high-resistance path to the driver circuit 308. In this example embodiment, based on the low Vbias, the control transistor 352 is caused to offer a high resistance. For example, the control transistor 352 is switched to an OFF-state during the short-circuit event (as the Vbias is fed to the gate node 386 of the control transistor 352) and the control transistor 352 provides a high resistance. Accordingly, during the short-circuit event, a path offered to the driver transistor 324 by the control circuit 332 (a combination of the control transistor 352 and the control resistor 354) is of the high-resistance path. The high-resistance path clamps (or limits) the amount of current that is demanded by the driver transistor 324, and hence there is a less voltage drop across the first and third (source and gate, respectively) terminals (318 and 322, respectively) of the pass switch 302. Accordingly, the source-gate voltage (Vsg) of the pass switch 302 is clamped and the load current (the short-circuit current) is limited. It should be noted that the current consumption in the voltage regulator 300 is reduced as compared to the current consumption in the voltage regulator 100, as the current demanded in the driver circuit 308 is clamped during the short-circuit event. In this manner, by using the control transistor 352 to provide the high-resistance path to the driver transistor 324 of the driver circuit 308, short-circuit protection is provided to the voltage regulator 300.

In an example, during the short-circuit event, the low bias voltage (Vbias) is generated for providing the high-resistance path to the driver circuit 308 by enabling the voltage at the node 376 (for example, Vx) to be substantially equal to the voltage at the node 378 (for example, Vy) of the amplifier circuit 330. In one form, resistance of the second resistor 346 (R2) is less than resistance of the first resistor 340 (R1), for example, R2 can have a value of one tenth of the R1 (for example R2≅R1/10). Hence by assuming R1=10R2, and bias currents for the first bias current source 344 and the second bias current source 350 equal to 1 micro Ampere (μA), we can determine the load current (shown as 314) at which the short-circuit event occurs as per the following equations:

$$Vx=1\ \mu A*R1 \tag{1}$$

$$Vy=1\ \mu A*(R1/10)+(Iload/N)*(R1/10) \tag{2}$$

where Iload is the load current (shown as 314) and N is ratio of the sizes of the pass switch 302 and the sense transistor 334.

For Vx=Vy, equations (1) and (2) are equated as per the following equation (3):

$$1\ \mu A*R1=1\ \mu A*(R1/10)+(Iload/N)*(R1/10) \tag{3}$$

$$\text{Hence, } Iload=9*\mu A*N \tag{4}$$

For N=1000, Iload=9*μA*1000. Hence in this example, at a load current of 9*μA*1000, the short-circuit event occurs, and Vbias becomes equal to a voltage that provides the high-resistance path to the driver circuit 308. A general expression for the relation between R1, R2, Iload, Ibias and N can be determined as per the following equation (5):

$$Iload=N*((R1/R2)-1)*Ibias \tag{5}$$

where, Ibias is the bias current generated by the first bias current source 344 or the second bias current source 350.

As the Vbias reduces in the short-circuit event, the Vbias causes the control transistor 352 to achieve an OFF state, thereby offering high resistance in the path of the driver circuit 308, and clamping the current in the driver circuit 308. As the current in the driver circuit 308 is clamped, the Vsg of the pass switch 302 is also clamped and accordingly the short-circuit current (load current in the short-circuit event) is limited.

Figure 4:
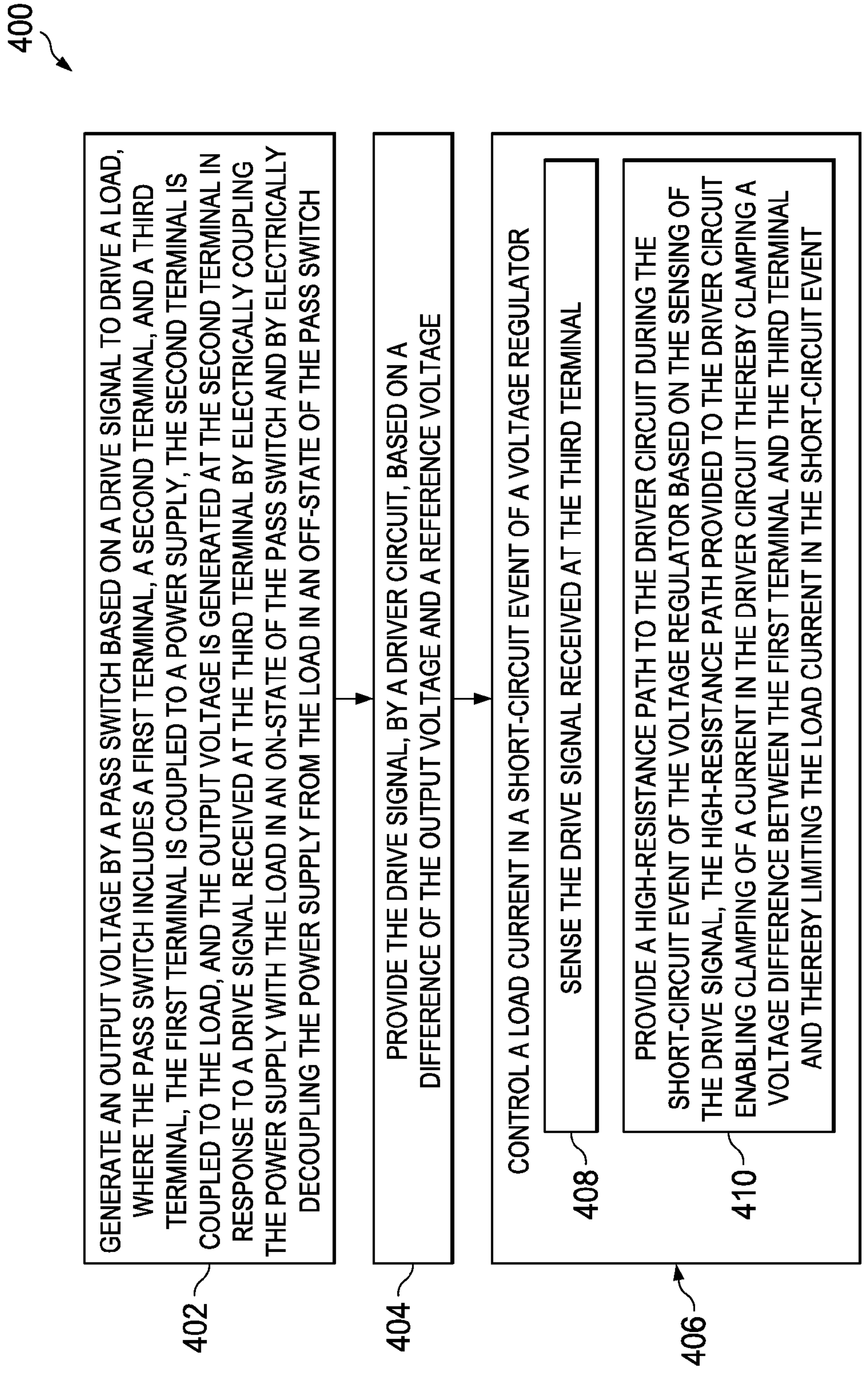
FIG. 4 illustrates a flowchart of an example method of providing short-circuit protection in a voltage regulator, in accordance with an embodiment.

FIG. 4 illustrates a flowchart of an example method 400 of providing short-circuit protection in a voltage regulator, for example the voltage regulators 200 or 300, as explained with reference to FIG. 2 and FIG. 3, respectively. An example of the voltage regulator is a low dropout (LDO) voltage regulator. The LDO voltage regulator is a linear regulator that operates using a least input-output differential voltage. Examples of the portable electronic devices, but are not limited to, mobile phones, laptops, digital cameras, tablets, and portable gaming devices.

At 402, the method 400 includes generating an output voltage by a pass switch based on a drive signal to drive a load. The pass switch (for example, the pass switch 205 or the pass switch 302) includes a first terminal, a second terminal and a third terminal, where the first terminal is coupled to a power supply and the second terminal is coupled to the load. The output voltage is generated at the second terminal in response to a drive signal received at the third terminal by electrically coupling the power supply with the load in an ON-state of the pass switch and by electrically decoupling the power supply from the load in an OFF-state of the pass switch. The pass switch is configured to generate the output voltage in response to the drive signal from a driver circuit (for example, the driver circuit 220 or the driver circuit 308) of the pass switch.

At 404, the drive signal is provided, by the driver circuit, based on a difference of the output voltage and a reference voltage. The driver circuit is coupled to the third terminal of the pass switch. For instance, in an example embodiment, an error amplifier can be implemented to generate an error signal based on the difference of the output voltage and the reference voltage, and the drive signal is generated based on the error signal. In an example embodiment, the reference voltage and the output voltage are compared, for example, by the voltage error amplifier 210 or 304 (refer FIG. 2 and FIG. 3), to determine the error voltage. The pass switch is then driven, for example by the drive signal provided by the driver transistor 324 (refer FIG. 3), where the drive signal is generated based on the error voltage.

At 406, the method 400 includes controlling a load current in a short-circuit event of the voltage regulator. In an example embodiment, operation 406 is performed at operations 408 and 410. In an example embodiment, at 408, the method 406 includes sensing the drive signal received at the third terminal. At 410, the method 406 includes providing a high-resistance path to the driver circuit during the short-circuit event of the voltage regulator based on the sensing of the drive signal. It should be noted that the high-resistance path provided to the driver circuit enables clamping of a current in the driver circuit thereby clamping a voltage difference between the first terminal and the third terminal. As the voltage difference between the first terminal and the third terminal (for example, the source to gate voltage of the pass switch) is clamped (for example, reduced), the load current in the short-circuit event is also limited (for example, reduced). It should further be noted that the method 400 includes providing a low-resistance path to the driver circuit during a non short-circuit event.

In an example embodiment, the load current in a short-circuit event is controlled by a short-circuit protection circuit (for example, the short-circuit protection circuit 225 or 310), where the short-circuit protection circuit includes a sense circuit, an amplifier circuit and a control circuit including a control transistor and a resistor. The sense circuit is coupled to the pass switch at the third terminal and the second terminal. The amplifier circuit is coupled between the sense circuit and the control circuit. The drive signal at the third terminal is sensed to provide a sensed signal. A bias voltage is provided to an output node (of the amplifier circuit) in response to the sensed signal. A current (pull-down current) in the driver circuit is hence limited, by the control circuit, in response to the bias voltage by providing one of the low-resistance path or the high-resistance path to the driver circuit. In an example embodiment, the bias voltage is provided as a high bias voltage during the non short-circuit event. The high bias voltage is equal to a voltage of the power supply and enables the control circuit to provide the low-resistance path, In an example embodiment, the bias voltage is provided as a low bias voltage during the short-circuit event. The low bias voltage is less than the voltage of the power supply, where the low bias voltage enables the control circuit to provide the high-resistance path. In an example embodiment, the load current is further controlled by providing a low-resistance path to the driver circuit during the non short-circuit event by switching ON a control transistor of the control circuit based on the high bias voltage, and by providing a high-resistance path to the driver circuit during the short-circuit event by switching OFF a control transistor of the control circuit based on the low bias voltage. The high-resistance path is configured to clamp the voltage difference between the first terminal and the third terminal, and to thereby limit the load current during the short-circuit event.

Without in any way limiting the scope, interpretation, or application of the claims appearing below, advantages of one or more of the example embodiments disclosed herein include providing short-circuit protection in a voltage regulator by providing a high-resistance path for a driver circuit of a pass switch and clamping source-gate voltage of the pass switch, during a short-circuit event. The short-circuit protection circuit of the voltage regulator provides a low-resistance path to the driver circuit when a load current is lesser than a threshold current for a non short-circuit event and provides the high-resistance path to the driver circuit when the load current is higher than the threshold current for the short-circuit event. The high-resistance path further limits the load current during the short-circuit event. The source-gate voltage of the pass switch that is increased during the short-circuit event is also decreased due to the high-resistance path. Hence, the high-pull down current demanded by the driver circuit is limited by degenerating a driver transistor in the driver circuit, and a quiescent current in the voltage regulator is also reduced, thereby decreasing current consumption in the voltage regulator. By achieving reduced current consumption, battery life of an electronic device that uses the voltage regulator is extended. By using the short-circuit protection circuit, transconductance (gm) of the driver circuit is reduced during the short-circuit event, thereby reducing gain-bandwidth and avoiding stability issues concerning the voltage regulator during the short-circuit event.

Although the present technology has been described with reference to specific example embodiments, it is noted that various modifications and changes can be made to these embodiments without departing from the broad spirit and scope of the present technology. For example, the various circuits, etc., described herein can be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the various electrical structures and methods can be embodied using transistors, logic gates, and electrical circuits (for example, application specific integrated circuit (ASIC) circuitry and/or in Digital Signal Processor (DSP) circuitry).

Also, techniques, devices, subsystems and methods described and illustrated in the various embodiments as discrete or separate can be combined or integrated with other systems, modules, techniques, or methods without departing from the scope of the present technology. Other items shown or discussed as directly coupled or communicating with each other can be coupled through some interface or device, such that the items can no longer be considered directly coupled to each other but can still be indirectly coupled and in communication, whether electrically, mechanically, or otherwise, with one another. Other examples of changes, substitutions, and alterations ascertainable by one skilled in the art, upon or subsequent to studying the example embodiments disclosed herein, can be made without departing from the spirit and scope of the present technology.

It is noted that the terminology "coupled to" does not necessarily indicate a direct physical relationship. For example, when two components are described as being "coupled to" one another, there may be one or more other devices, materials, etc., that are coupled between, attaching, integrating, etc., the two components. As such, the terminology "coupled to" shall be given its broadest possible meaning unless otherwise indicated.

It should be noted that reference throughout this specification to features, advantages, or similar language does not imply that all of the features and advantages should be or are in any single embodiment. Rather, language referring to the features and advantages can be understood to mean that a specific feature, advantage, or characteristic described in connection with an embodiment can be included in at least one embodiment of the present technology. Thus, discussions of the features and advantages, and similar language, throughout this specification can, but do not necessarily, refer to the same embodiment.

Various embodiments of the present disclosure, as discussed above, can be practiced with steps and/or operations in a different order, and/or with hardware elements in configurations which are different than those which are disclosed. Therefore, although the technology has been described based upon these example embodiments, it is noted that certain modifications, variations, and alternative constructions can be apparent and well within the spirit and scope of the technology. Although various example embodiments of the present technology are described herein in a language specific to structural features and/or methodological acts, the subject matter defined in the appended claims is not necessarily limited to the specific features or acts described above. Rather, the specific features and acts described above are disclosed as example forms of implementing the claims.

What is claimed is:

1. A voltage regulator, comprising:

a pass switch for electrically coupling a power supply with a load during an ON-state of the pass switch and for electrically decoupling the power supply from the load during an OFF-state of the pass switch, the pass-switch comprising a first terminal, a second terminal and a third terminal, the first terminal coupled to the power supply and the second terminal coupled to the load, the pass switch configured to generate an output voltage at the second terminal in response to a drive signal received at the third terminal;

a voltage error amplifier comprising a first input terminal, a second input terminal and an output terminal, configured to receive a reference voltage at the first input terminal and the output voltage at the second input terminal, and further configured to generate an error voltage at the output terminal based on a difference of the reference voltage and the output voltage;

a driver circuit coupled to the voltage error amplifier at the output terminal and to the pass switch at the third terminal, the driver circuit configured to generate the drive signal in response to the error voltage; and a short-circuit protection circuit coupled to the pass switch at the third terminal and configured to:

sense the drive signal received at the third terminal;

provide a high-resistance path to the driver circuit during a short-circuit event of the voltage regulator in response to the drive signal, wherein the high-resistance path provided to the driver circuit enables clamping a current in the driver circuit thereby clamping a voltage difference between the first terminal and the third terminal and thereby limiting a load current in the short-circuit event; and provide a low-resistance path to the driver circuit during a non short-circuit event.

2. The voltage regulator of claim 1, wherein the driver circuit further comprises:

a driver transistor comprising a first node, a second node and a third node, the second node coupled to the short-circuit protection circuit and the third node coupled to the output terminal of the voltage error amplifier, and wherein the driver transistor is configured to generate the drive signal in response to the error voltage received at the third node; and a resistor configured to couple the first node of the driver transistor and the third terminal of the pass switch to the power supply.

3. The voltage regulator of claim 2, wherein the short-circuit protection circuit comprises:

a sense circuit coupled to the pass switch at the third terminal and the second terminal, the sense circuit configured to sense the drive signal at the third terminal and to provide a sensed signal at a terminal of the sense circuit;

an amplifier circuit coupled to the sense circuit, the amplifier circuit configured to provide a bias voltage to an output node of the amplifier circuit in response to the sensed signal; and a control circuit coupled to the amplifier circuit and configured to clamp the current in the driver circuit in response to the bias voltage by providing one of the low-resistance path and the high-resistance path to the driver circuit.

4. The voltage regulator of claim 3, wherein the sense circuit comprises:

a sense transistor comprising a source terminal, a drain terminal and a gate terminal, the drain terminal coupled to the second terminal and the gate terminal coupled to the third terminal of the pass switch, wherein the sense transistor is configured to force the sensed signal as a high voltage signal in the non short-circuit event, and is configured to force the sensed signal as a low voltage signal in the short-circuit event.

5. The voltage regulator of claim 4, wherein the amplifier circuit comprises:

a first amplifier circuit comprising a first resistor, a first transistor, and a first bias current source, the first resistor coupled between the power supply and the first transistor, and the first bias current source coupled between the first transistor and a ground terminal, the first amplifier circuit configured to generate a first voltage at a node connecting the first resistor and the first transistor, and a second amplifier circuit coupled to the first amplifier circuit and comprising a second resistor, a second transistor, and a second bias current source, the second resistor coupled between the power supply and the second transistor, and the second bias current source coupled between the second transistor and the ground terminal, the second amplifier circuit configured to generate a second voltage at a node connecting the second resistor and the second transistor, wherein the amplifier circuit is configured to generate the bias voltage at the output node of the amplifier circuit based on the first voltage and the second voltage;

wherein during the non short-circuit event, the first voltage is substantially equal to the second voltage and the bias voltage is a high bias voltage being substantially equal to a voltage of the power supply; and wherein during the short-circuit event, the first voltage is substantially lower than the second voltage and the bias voltage is a low bias voltage being substantially lower than the voltage of the power supply.

6. The voltage regulator of claim 5, wherein the control circuit comprises:

a control transistor comprising a drain node, a source node and a gate node, the drain node coupled to the second node of the driver transistor and the source node coupled to the ground terminal, the control transistor configured to receive the bias voltage at the gate node and to achieve an ON-state during the non short-circuit event and to achieve an OFF-state during the short-circuit event; and a control resistor coupled between the second node of the driver transistor and the source node of the control transistor, wherein the control circuit is configured to provide a high resistance in the OFF-state of the control transistor thereby providing the high-resistance path to the driver circuit in the short-circuit event.

7. The voltage regulator of claim 6, wherein the first bias current source and the second bias current source provide equal bias currents.

8. The voltage regulator of claim 7, wherein each of the pass switch, the sense transistor, the first transistor, and the second transistor comprises a p-type metal oxide semiconductor (PMOS) transistor, and wherein each of the control transistor and the driver transistor comprises an n-type metal oxide semiconductor (NMOS) transistor.

9. A method of providing short-circuit protection in a voltage regulator, the method comprising:

generating an output voltage by a pass switch based on a drive signal to drive a load, the pass-switch comprising a first terminal, a second terminal and a third terminal, the first terminal coupled to a power supply, the second terminal coupled to the load, and the output voltage generated at the second terminal in response to a drive signal received at the third terminal by electrically coupling the power supply with the load in an ON-state of the pass switch and by electrically decoupling the power supply from the load in an OFF-state of the pass switch;

providing the drive signal, by a driver circuit, based on a difference of the output voltage and a reference voltage; and controlling a load current in a short-circuit event of the voltage regulator by performing:

sensing the drive signal received at the third terminal; and providing a high-resistance path to the driver circuit during the short-circuit event of the voltage regulator based on the sensing of the drive signal, the high-resistance path provided to the driver circuit enabling clamping of a current in the driver circuit thereby clamping a voltage difference between the first terminal and the third terminal and thereby limiting the load current in the short-circuit event.

10. The method of claim 9, further comprising:

comparing the reference voltage and the output voltage to generate an error voltage; and generating the drive signal in response to the error voltage.

11. The method of claim 9, wherein controlling the load current in the short-circuit event comprises:

sensing the drive signal at the third terminal by a sense circuit to provide a sensed signal at a terminal of the sense circuit;

providing a bias voltage by an amplifier circuit to an output node of the amplifier circuit in response to the sensed signal; and clamping the current in the driver circuit, with a control circuit, by providing one of a low-resistance path and the high-resistance path to the driver circuit in response to the bias voltage.

12. The method of claim 11, further comprising:

providing the bias voltage as a high bias voltage during a non short-circuit event, the high bias voltage being substantially equal to a voltage of the power supply, wherein the high bias voltage enables the control circuit to provide the low-resistance path, and providing the bias voltage as a low bias voltage during the short-circuit event, the low bias voltage being substantially lower than the voltage of the power supply, wherein the low bias voltage enables the control circuit to provide the high-resistance path.

13. The method of claim 12, wherein controlling the load current further comprises:

providing the low-resistance path to the driver circuit during the non short-circuit event by switching ON a control transistor of the control circuit based on the high bias voltage, and providing the high-resistance path to the driver circuit during the short-circuit event by switching OFF the control transistor of the control circuit based on the low bias voltage, wherein the high-resistance path is configured to clamp the voltage difference between the first terminal and the third terminal, and to thereby limit the load current during the short-circuit event.

* * * * *